United States Patent

[11] 3,586,086

| [72] | Inventor | Jacques Boileau<br>Clermont-Ferrand, France |
|---|---|---|
| [21] | Appl. No. | 807,593 |
| [22] | Filed | Mar. 17, 1969 |
| [45] | Patented | June 22, 1971 |
| [73] | Assignee | Compagnie Generale Des Etablissements<br>Michelin raison sociale Michelin & Cie<br>Clermont-Ferrand (Puy-de-Dome), France |
| [32] | Priority | Mar. 18, 1968, Jan. 20, 1969 |
| [33] | | France |
| [31] | | 144297 and 6900979 |

[54] PNEUMATIC TIRE TREAD
10 Claims, 5 Drawing Figs.

[52] U.S. Cl. .................................................. 152/209
[51] Int. Cl. ........................................... B60c 11/04

[50] Field of Search ........................................... 152/209, 212

[56] References Cited
UNITED STATES PATENTS

| 2,891,594 | 6/1959 | Ford .............................. | 152/209 |
| 3,000,421 | 9/1961 | Hack et al. ..................... | 152/209 |

*Primary Examiner*—James B. Marbert
*Attorney*—Brumbaugh, Graves, Donohue & Raymond ABSTRACT: The tread of a pneumatic tire is formed with circumferential grooves. The depth dimensions of the grooves are inclined with respect to the perpendicular to the tread. The angles of inclination are all within the range of 45° in one direction to 45° in the other direction.

PATENTED JUN 22 1971

INVENTOR.
JACQUES BOILEAU
BY
Bumbaugh, Graves, Donohue & Raymond
his ATTORNEYS

INVENTOR.
JACQUES BOILEAU

PNEUMATIC TIRE TREAD

BACKGROUND OF THE INVENTION

The present invention relates to pneumatic tires and, more particularly, to the arrangement and structure of the tread moldings.

The molding, i.e., those portions of the tread which are hollowed out and raised, have the purpose of improving adhesion of the tire to the ground, taking into consideration the condition of the ground on which the tire is intended to travel and the type of service it is expected to perform.

Experience has shown that, generally speaking, the qualities of adhesion of the tread to the ground and of resistance to wear and tear oppose one another. In order to improve the grip, it is generally necessary to increase the length of incisions and subdivide the raised portions so as to render them more mobile. In order to improve resistance to wear, it is necessary, in contrast thereto, to cut into the tread as little as possible and to have raised portions that are massive and rigid. In practice, this has led to a compromise arrived at empirically between a smooth tire tread and a tire the surface of which consists of point-shaped molded portions.

SUMMARY OF THE INVENTION

An object of the invention is to provide a pneumatic tire comprising a tread having both improved grip and improved resistance to wear and tear.

The foregoing and other objects of the invention are attained by the provision of a tire comprising a tread having circumferential ridges delimited by circumferential grooves inclined in relation to the perpendicular to the surface of the tread. The angles of inclination of successive grooves range in the aggregate from 45° in one direction to 45° in the other direction, and the spacing between grooves in the transverse direction is greater than their depth.

The inclination of a groove is defined as the angle of the bisecting line of the meridian cross section of the groove with the perpendicular to the tread at the point in which the bisecting line meets the surface of the tread.

Preferably, the maximum angle of inclination is 20° to 30°. An appreciable effect can be observed in cases where the maximum angle is at least 10°. Angles greater than 45° result in too much wear and tear in spots.

In a first embodiment of the invention, the grooves are all inclined at the same angle, but symmetrically with respect to the median plane (or with respect to a plane parallel to the median plane), the direction of inclination being such that the grooves arranged on either side of the median plane (or the plane of symmetry parallel to the median plane) converge in the direction of the interior of the tire.

In a second embodiment of the invention, there is a combination of (a) grooves penetrating into the tread perpendicularly to the surface of such tread and (b) grooves penetrating into the tread obliquely with respect to such surface. The inclined grooves can be concentrated, for example, on one of the transverse halves or portions of the tread while the perpendicular grooves are located in the other half or portion. The inclined grooves and the perpendicular, or substantially perpendicular, grooves can also be distributed alternatingly, for example, over all of the width of the tread.

In a third embodiment of the invention, there are, in the two halves of the tread, grooves inclined in the same direction (and not in different directions in each half).

In a fourth embodiment of the invention, there are, over all of the width of the tread, grooves inclined at different angles, the variation in angles from groove to groove always being in the same direction from one edge of the tread to the other.

In general, the inclinations of the grooves can vary from one edge to the other within the range of 45° in one direction to 45° in the other direction.

If the raised portions of the tread are given a transverse cross section which, instead of being rectangular, has the shape of a parallelogram (or of a trapezoid with nonparallel sides slightly converging toward the exterior of the tire), there is better resistance to skidding as well as to wear and tear, for the acute angle of the parallelogram or trapezoid approximating a parallelogram provides the elasticity facilitating adhesion and the obtuse angle the massiveness favoring resistance to wear and tear. The surface of the tread in contact with the ground, rather than the lateral surfaces of the grooves, should provide the large side of the parallelogram.

The inclined circumferential grooves can have any design whatever, such as a zigzag or wavy line. It is possible to combine the wide cutouts with fine incisions which are given the same inclination with respect to the median plane. The inclined circumferential grooves can also be connected by transverse or oblique grooves which can be inclined with respect to the outer surface of the tread or perpendicular thereto.

BRIEF DESCRIPTION OF THE DRAWING

An understanding of additional aspects of the invention may be gained from a consideration of the following detailed description of several representative embodiments thereof, in conjunction with the accompanying FIGURES of the drawing, wherein.

DESCRIPTION OF THE PREFERRED EMBODIMENTS

The treads shown are divided into five ridges of substantially equal width designated by numbers 1 to 5 from edge to edge and six zigzag longitudinal grooves numbered from 6 to 11.

Figure 2:
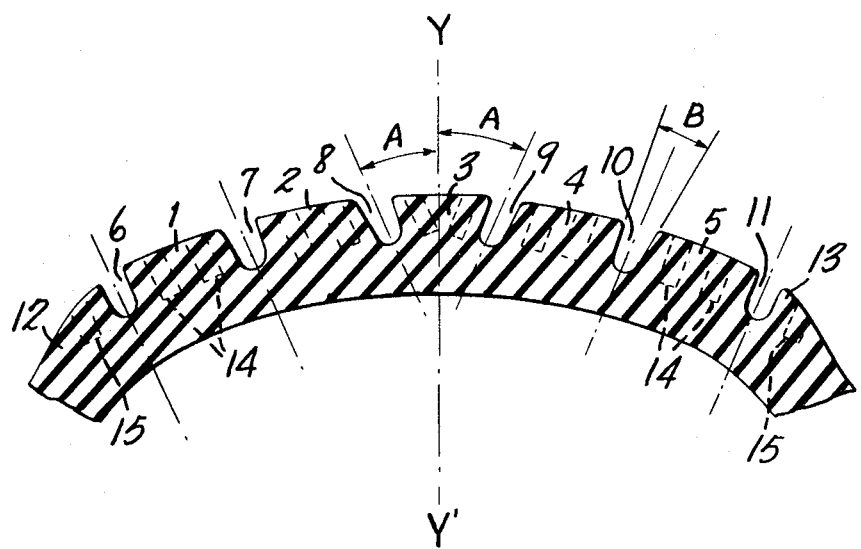
FIG. 2 is a radial cross section of the tread through line 2—2 of FIG. 1 and looking in the direction of the arrows.

As FIG. 2 shows, these grooves are inclined with respect to the median plane YY' by an angle A of approximately 25°, the grooves 6 to 8 being inclined in one direction and the grooves 9 to 11 in the other direction. The lateral walls of the grooves are also slightly divergent toward the exterior of the tire, as is customary, and they form an angle B of at least 10° with each other.

Figure 1:
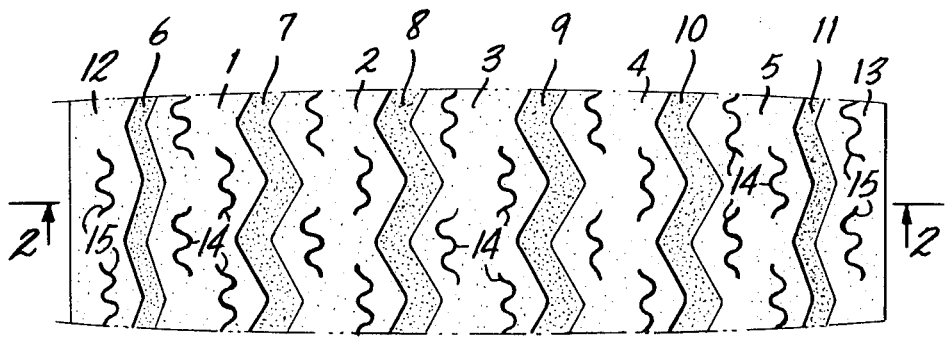
FIG. 1 is a plan view of a short section of a tire tread in accordance with the invention.

FIG. 1 also shows that the ridges 1 to 5 as well as the sidewall portions 12 and 13 adjacent to the tread comprise fine incisions, such as 14 and 15 shown in dashes in FIG. 2, which have substantially the same depth and the same inclination as the grooves 6 to 11 closest to them.

Figure 3:
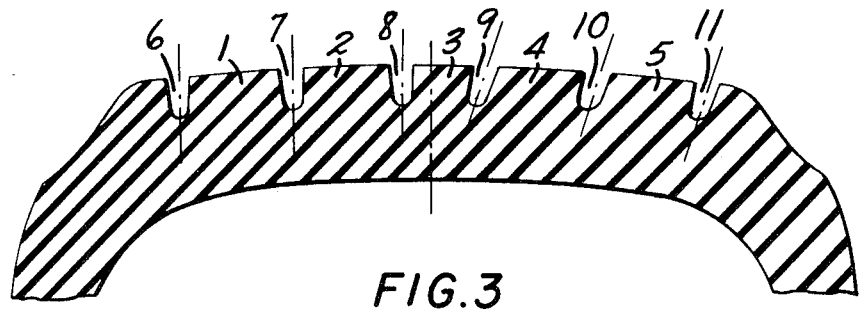
FIGS. 3 to 5 are radial cross sections of three different treads according to the invention the plan views of which are similar to that of FIG. 1.

In the embodiment of FIG. 3 the grooves 6, 7 and 8 arranged in the left half of the tread penetrate into the rubber of the tread in a direction which is substantially perpendicular to the surface of the tread, as shown by the bisecting lines in dots and dashes. The grooves 9, 10 and 11, on the other hand, are oblique and the bisecting lines form with the perpendicular to the surface of the tread an angle of approximately 25°.

Figure 4:
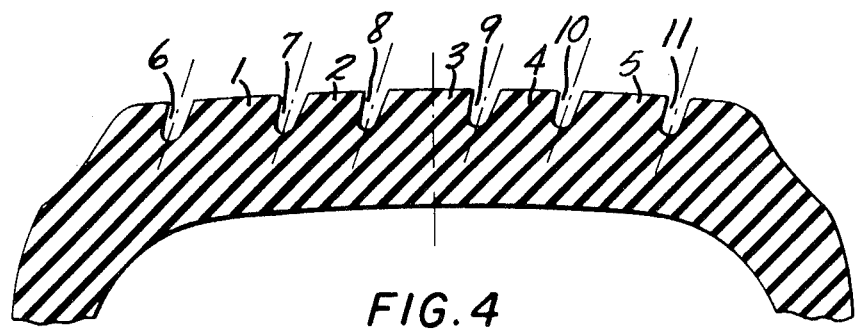

In the embodiment of FIG. 4, the six grooves are all inclined in the same direction and at substantially the same angle, in contrast to the above.

Figure 5:
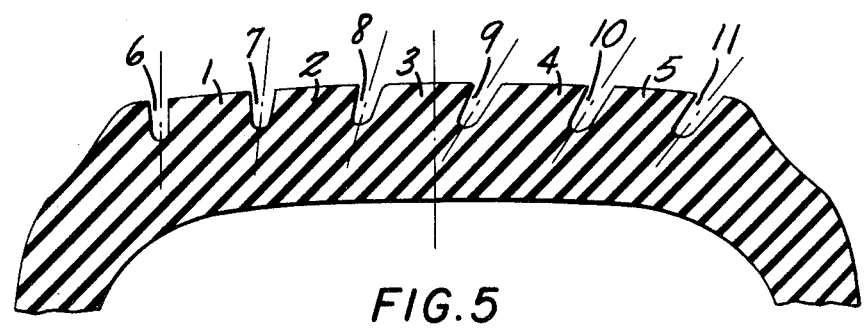

In the embodiment of FIG. 5, the six grooves 6 to 11 are inclined in various ways, the angle ranging from 0° for groove 6 to 45° for groove 11 and the angle increasing by approximately 9° from groove to groove.

Thus there is provided in accordance with the invention a novel and highly effective tire tread providing both improved grip and improved resistance to wear and tear. Many modifications of the representative embodiments disclosed will readily occur to those skilled in the art. For example, a different system of varying the inclination of the grooves can be used. Thus, in the case shown in FIG. 5, the grooves 6 and 7 can be inclined by an angle of 5°, the grooves 8 and 9 by an angle of 25°, and the grooves 10 and 11 by an angle of 45°. The invention includes all such modifications within the scope of the appended claims.

I claim:

1. A pneumatic tire comprising a tread formed with circumferential grooves, the depth dimension of said grooves being inclined with respect to the perpendicular to the surface of said tread, the spacing between said grooves in a transverse direction being greater than their depth, and the angles of inclination of said grooves all being within the range of 45° in one direction to 45° in the other direction.

2. A pneumatic tire according to claim 1 wherein the angles of inclination of successive grooves vary in the same sense from one edge of the tread to the other, thereby forming a progression.

3. A pneumatic tire according to claim 2 wherein the angles of inclination of successive grooves vary between 0° for the groove closest to one edge and 45° for the groove closest to the other edge.

4. A pneumatic tire according to claim 1 wherein said grooves on one side of the median plane of the tire are inclined in one direction and said grooves on the other side of said median plane are inclined in the other direction.

5. A pneumatic tire according to claim 1 wherein said inclined grooves are all on one side of the median plane of the tire, further comprising grooves on the other side of said median plane having a depth dimension substantially perpendicular to the depth dimension of said tread.

6. A pneumatic tire according to claim 1 wherein said grooves are all inclined in the same direction and form the same angle.

7. A pneumatic tire according to claim 1 wherein the angle of inclination of at least one groove is within the range of 10° to 45°.

8. A pneumatic tire according to claim 7 wherein said angle of inclination is within the range of 20° to 30°.

9. A pneumatic tire according to claim 1 wherein at least one groove is inwardly inclined with respect to at least one other groove, so that said one groove and said other groove converge toward the inside of the tire.

10. A pneumatic tire according to claim 4 wherein said grooves on one side of the median plane are inclined toward the inside of the tire and said grooves on the other side of said median plane are also inclined toward the inside of the tire, so that the grooves on the opposite sides of the median plane converge toward the inside of the tire.